United States Patent [19]

Lapeyre

[11] Patent Number: 4,832,183
[45] Date of Patent: May 23, 1989

[54] CONVEYOR BELT HAVING INSERTABLE & SELECTABLE CONVEYING MEMBER

[75] Inventor: James M. Lapeyre, New Orleans, La.

[73] Assignee: The Laitram Corporation, New Orleans, La.

[21] Appl. No.: 946,141

[22] Filed: Dec. 24, 1986

Related U.S. Application Data

[63] Continuation of Ser. No. 642,534, Aug. 20, 1984, abandoned.

[51] Int. Cl.⁴ .............................................. B65G 15/42
[52] U.S. Cl. ................................. 198/699; 198/690.2
[58] Field of Search ................. 198/688.1, 690.2, 698, 198/699, 699.1, 731, 803.01, 853

[56] References Cited

U.S. PATENT DOCUMENTS

| | | | |
|---|---|---|---|
| 2,856,064 | 10/1958 | DeWindt | 198/688 |
| 3,610,407 | 10/1971 | Prodzenski | 198/648 |
| 4,080,842 | 3/1978 | Lapeyre et al. | 198/853 |
| 4,084,687 | 4/1978 | Lapeyre | 198/844 |
| 4,213,527 | 7/1980 | Lapeyre et al. | 198/853 |
| 4,351,429 | 9/1982 | Garvey | 198/688 |

FOREIGN PATENT DOCUMENTS

| | | | |
|---|---|---|---|
| 2714273 | 2/1978 | Fed. Rep. of Germany | 198/803.2 |
| 2802722 | 7/1979 | Fed. Rep. of Germany | 198/688 |
| 52-6162 | 1/1977 | Japan | 198/688 |

Primary Examiner—Robert J. Spar
Assistant Examiner—Lyle Kimms
Attorney, Agent, or Firm—James C. Kesterson

[57] ABSTRACT

A module for forming a conveyor belt (22) having a variable and selectable conveying surface and which is comprised of a plurality of identical modules (36, 38, 40, 42 and 44) preferably formed by injection molding is disclosed. Each module (36) has a top side and bottom side, and includes a plurality of elongated elements each of which has first pivot ends (36A) and second pivot ends (36B) formed integral with an intermediate section (54). Each of the plurality of pivot ends define pivot holes (62) which have axes (64 and 66) aligned such that the pivot ends of other modules may be pivotally connected by a pivot rod (46 and 50). Modules of a conveying belt receives a driving force which is applied to the module orthogonally to the pivot axis and substantially parallel to a first plane defined by the first and second axis (64 and 66). The top side of each module defines an area (74) for attaching a conveying membver (39) and the conveying member (39) has a bottom side or attaching portion (72) which cooperates with the area (74) on the top side of the base member (37). In a preferred embodiment, the conveying member (39) may be inserted in the recess (74) of the base member (37) to form a combination unit. Each conveying member has a top side (76) which may be of substantially any selected size and/or shape such that the conveyor belt (22) may present a conveying surface of any desired shape suitable for handling various types of differently shaped items. By providing a common base member, which may receive a conveying member of selected shapes, it can be seen that substantially any shape or style conveyor belt may be provided at minimum cost.

25 Claims, 5 Drawing Sheets

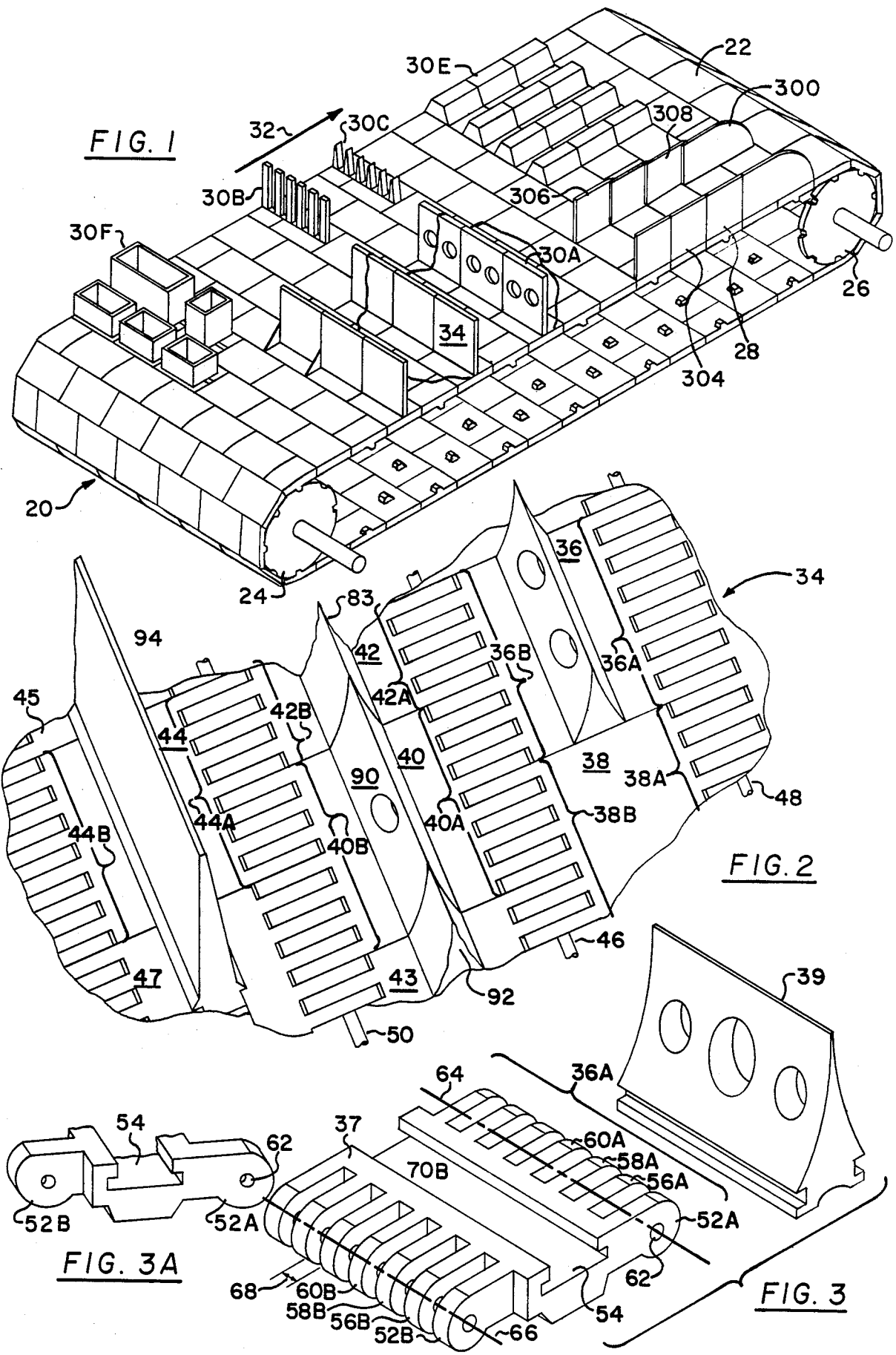

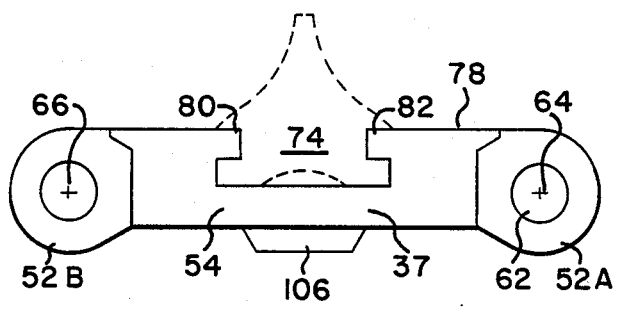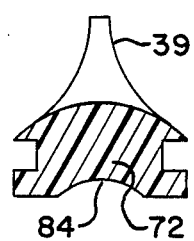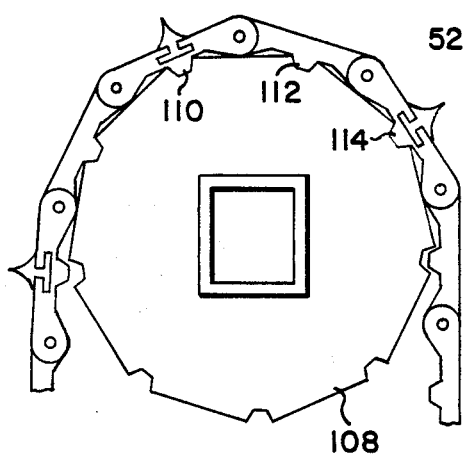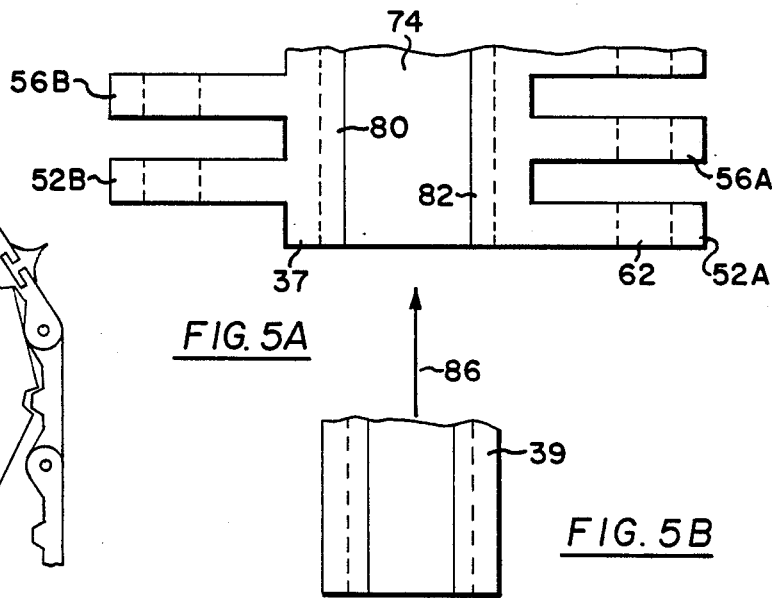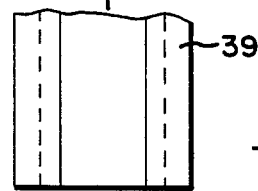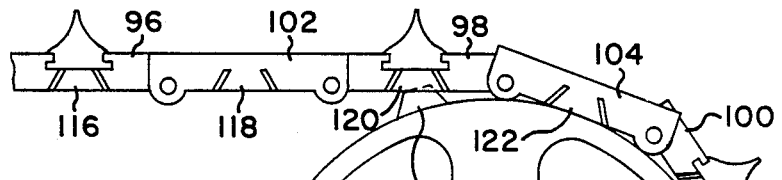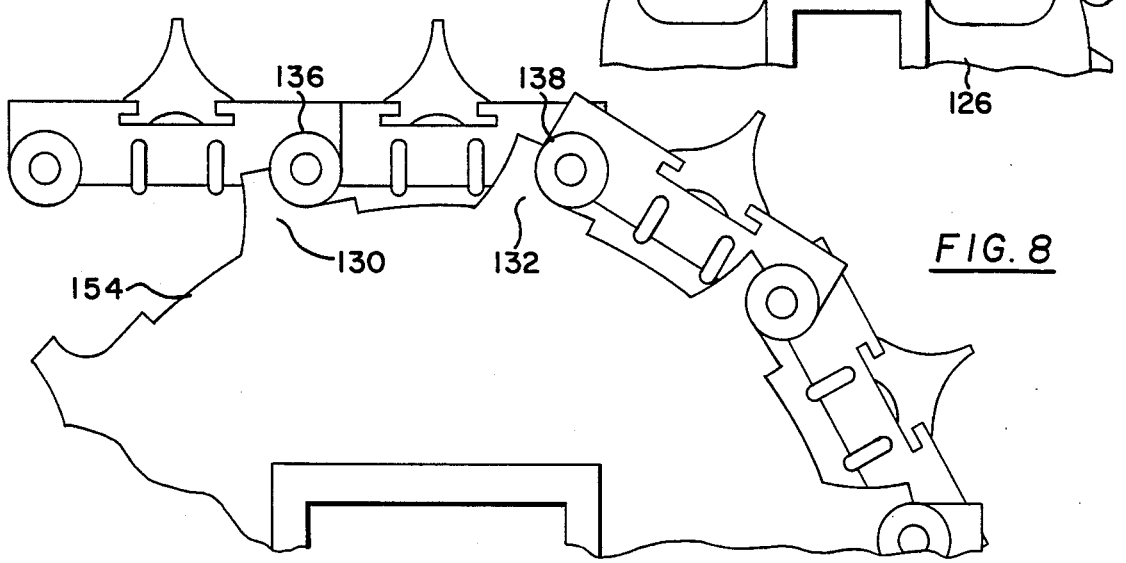

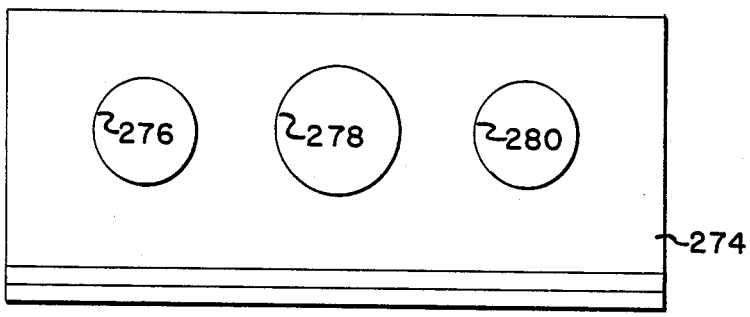
FIG. 20A
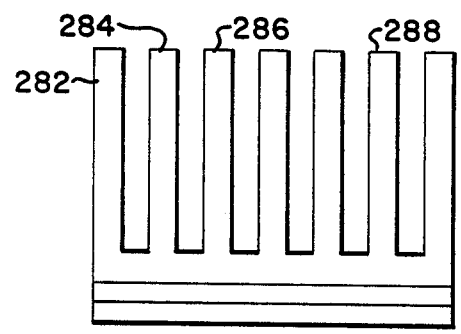
FIG. 20B
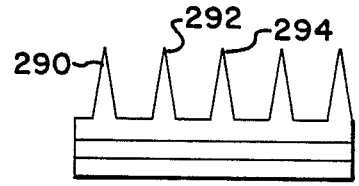
FIG. 20C
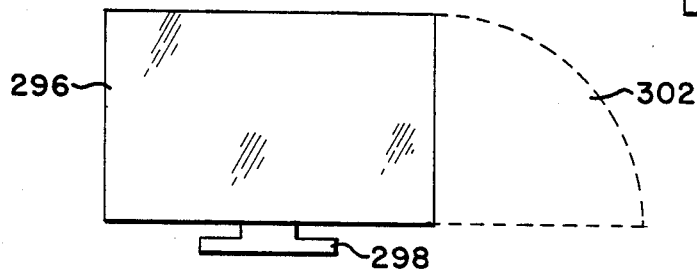
FIG. 21
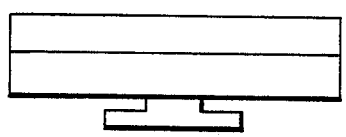
FIG. 22A
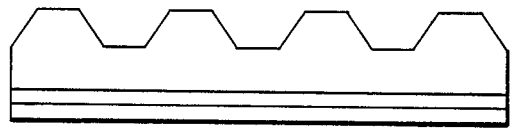
FIG. 22B
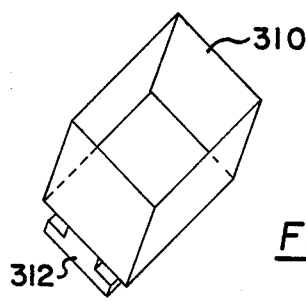
FIG. 23
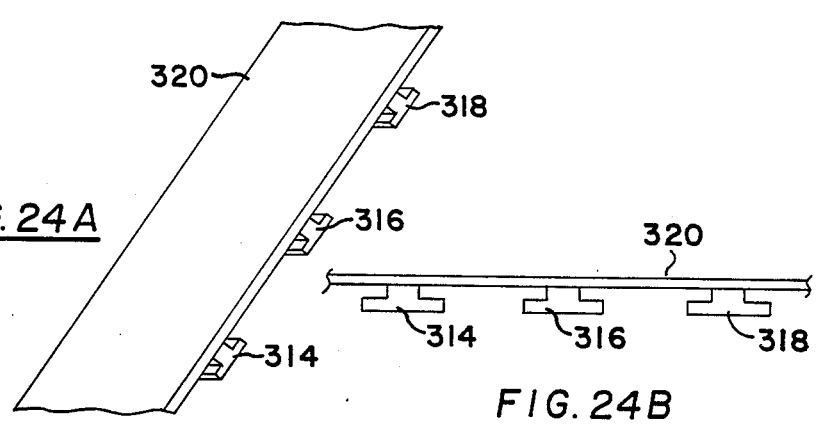
FIG. 24A
FIG. 24B

CONVEYOR BELT HAVING INSERTABLE & SELECTABLE CONVEYING MEMBER

This application is a continuation of application Ser. No. 642,534, filed Aug. 20, 1984, now abandoned.

TECHNICAL FIELD

This invention relates to a conveyor belt having a conveying or top surface selected from various shapes and styles, and more particularly to such a conveyor belt which includes a plurality of individual modules joined together by pivot rods. The modules are of a type preferably formed by injection molding and which include a first and second plurality of pivot ends which are intermeshed with pivot ends of other modules by means of pivot rods. The particular belt of this invention, can be driven by any known means, including means for driving the belt at the center of the pitch line of each module or means for driving the belt at the pivot end of each module. In addition, the belt could also be driven by operating as the armature of a linear motor or alternately could be driven by any other known method. However, regardless of the method of driving a belt formed by such modules, the present invention includes the use of a conveying member selected from a variety of styles which are attached to the top surface of at least a portion of the modules. The attached conveying members form the top of the conveyor belt surface to conform to any one of a selection of styles suitable for conveying items of different types and shapes. Since the basic modules of such a conveyor are of a standard shape, a variety of belts with complex conveying surfaces can be provided at a much lower cost. A low friction is typically maintained on the bottom of the belt which is normally contacting the conveyor frame in a sliding manner.

BACKGROUND

A typical modular conveyor belt is disclosed in U.S. Pat. No. 3,870,141 issued to J. M. Lapeyre on Mar. 11, 1975. According to this patent, identical modules formed by injection molding, are pivotally connected to one another to form a conveyor belt of a desired length. Each module includes a plurality of elongated elements, each of which has a first pivot end and a second pivot end. The plurality of elongated elements are connected together such that apertures defined in each of the first and second pivot ends lie along a first and second pivot axis respectively, which pivot axis are parallel one to the other. The link ends of one base member are intermeshed and pivotally connected by means of a pivot rod to the link ends of another base member until an entire belt having a desired length and width is formed. However, although the plastic belt built according to the teachings of this patent, has been well received by industry and has many particular uses, it is injected molded out of plastic, in a standard shape, and consequently its top surface is typically of a flat or raised rib configuration. Therefore, it may not be entirely satisfactory for transmitting unusual shaped items or items requiring a particular type of handling.

U.S. Pat. No. 4,171,045 issued on Oct. 16, 1979 also to Lapeyre, recognized the need for including a conveying surface which would not allow objects riding on the conveying surface to slip and thereby allow the belt to pass underneath. The belt disclosed and formed by the teachings of the U.S. Pat. No. 4,171,045, is similar to that of the U.S. Pat. No. 3,870,141 discussed heretofore except that selected ones of the elongated members include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J. M. Lapeyre, et al further discloses a base member for forming a link conveyor belt which has ridges or flight members extending transverse to the direction of travel for preventing the conveyor belt from slipping under articles riding on the conveyor belt surface. Similarly, U.S. Pat. No. 4,170,281 issued on Oct. 9, 1979 and U.S. Pat. No. 4,080,842 issued on Mar. 28, 1978, both to Lapeyre, also show conveying belts having members extending transverse to the conveying surface for moving articles on the conveying surface along the belt such that the belt cannot slip underneath the article. Of course, each of the particular conveying surfaces shown in these patents are typically formed by injection molding using a dedicated mold for each shape.

Still other modular link conveyor belt patent applications by Lapeyre and/or owned by the same assignee as the present invention which might be considered relevant to the present invention include: Ser. No. 483,210 entitled "Link Chain Belt filed Apr. 14, 1983; Ser. No. 179,523 entitled "Modular Center Drive Conveyor Belt filed Aug. 19, 1980; and Ser. No. 457,482 entitled "Lightweight Modular Conveyor Belt" filed Jan. 12, 1983 now U.S. Pat. No. 4,556,142. In addition two patent applications entitled "Conveyor Belt Having a High Friction Conveying Surface" and "End to End Molded Conveyor Belt Module" and filed concurrent with the present application disclose subject matter having some similarity to the present application, but do not include the specific teachings.

Thus, a review of the prior art patents as well as pending applications of the assignee of the present invention, reveals that to data there has not been a simple and inexpensive modular conveying belt particularly designed and formed for the purpose of providing a conveying surface of any selected shape on a standard base module such that a variety of items requiring special handling might be conveyed.

Therefore, it is an object of this invention to provide a module for forming a conveyor belt having one of a variety of selected shapes for conveying items requiring special handling.

It is another object of the present invention to provide a simple and inexpensive module formed by injection molding a base module to which can readily be attached a conveying member of a selected shape.

It is also an object of the present invention to provide a module for forming a conveyor belt with a selectable conveying surface, which belt is modular and has inherent capability for being readily built to custom widths and lengths as well as being repaired and replaced.

It is yet another object of the present invention to provide modules for forming a special purpose conveyor belt, which modules are not dependent upon the type of belt drive and may be incorporated with all present and existing drives.

DISCLOSURE OF THE INVENTION

Other objects and advantages will be obvious, and will in part appear hereinafter and will be accomplished by the present invention which provides a module for forming a conveyor belt having a conveying surface selectable from various shapes, and which is formed of a plurality of modules which are pivotally connected. All of the modules forming the belt are preferably formed by an injection molding process from an inherently slick or low friction material such as polypropylene. Each module has a top portion and a bottom portion, and includes a plurality of elongated elements each of which has a first pivot end and a second pivot end joined by an intermediate section. Each of the first and second pivot ends define a pivot axis, and the plurality of elongated elements of each module are connected such that all of the pivot axes defined by all of the first pivot ends are coaxial, thereby resulting in a first single pivot axis. Similarly, all of the pivot axes defined by all of the second pivot ends are also coaxial and result in a second single axis parallel to the first pivot axis defined by the first pivot ends. The length of each module is determined by the length of the elongated link elements, and the width of the base member is determined by the number of link elements connected together. Since the resulting pivot axes of the first and second pluralities of link ends are parallel, these axes lie in a common first plane. The thickness of each of the pivot ends is less than the spacing between the adjacent pivot ends so that the pivot ends of one module may be intermeshed and connected with the pivot ends of another module by means of a pivot rod when the pivot ends of the two modules are aligned coaxially. Selected ones of the modules (usually all) also include a means for receiving a driving force which is applied orthogonal to the pivot axis and substantially parallel to the common first plane for purposes of moving such modules. Consequently a belt, formed of the plurality of modules will be moved in a direction perpendicular to the parallel pivot axis. For example in one embodiment, such a means for receiving the driving force may comprise a tooth formed integrally or connected to the intermediate section of each module which cooperates with a recess formed in a sprocket drive wheel. Alternately, a module may define a recess which cooperates with a tooth on the sprocket wheel.

In addition, selected ones of the modules comprising the belt include a base member and a conveying member. Each of the base members define an attaching area on the top portion for attaching a conveying member of a selected shape. The conveying members include a top surface which exhibits the desired shape and also includes an appropriately shaped portion which cooperates with the attaching area of the base member such that the conveying member may be secured to the top portion of the base member by suitable means which may include locking receptacles, adhesives, rivets, screws or the like. However, according to a preferred embodiment, the top portion of the base member includes a recess for receiving the conveying member and the base member further includes an overhang member such as a tab, ledge, or other suitable locking means for restraining the conveying member in the recess.

BRIEF DESCRIPTION OF THE DRAWINGS

The above features of the present invention will be more clearly understood from consideration of the following description in connection with the accompanying drawings in which:

FIG. 1 shows a conveyor belt which includes a variety of different conveying surfaces which may be provided according to the teachings of this invention.

FIG. 2 shows a section of the conveyor belt of FIG. 1 and further illustrates a plurality of the modules making up the belt of FIG. 1 being pivotally connected, and which include vertical flight conveying members.

FIG. 3 is a perspective view of the base portion and a vertical flight insert of a single module of FIG. 2 wherein the first plurality of pivot ends are laterally offset from the second plurality of pivot ends.

FIG. 3A shows a break-away of a single elongated element making up the base member of FIG. 3.

FIGS. 4A and 4B are side views of the module and conveying member respectively of FIG. 3.

FIGS. 5A and 5B are top views of the module and conveying member respectively of FIG. 3

FIG. 6 discloses a typical belt formed of modules similar to that of FIG. 2 except that the method of driving is by means of a toothed sprocket wheel moving into recesses in individual modules.

FIG. 7 illustrates a side view of a belt of formed of modules of the type shown in FIG. 2 as the belt travels around a sprocket.

FIG. 8 illustrates a side view of a modular belt wherein the driving is accomplished by means of a toothed sprocket wheel engaging the link ends of each module.

FIGS. 20A, 20B and 20C show alternate embodiments of front views of conveying member having a side view similar to FIG. 4B.

FIG. 21 shows an insertable module which may be used to form side walls on the conveyor belt or alternately a series of channels running lengthwise to the conveyor belt.

FIGS. 22A and 22B are side and end views respectively of still another insertable conveying member which forms a conveyor belt having a series of longitudinal channels suitable for conveying tubular or stacked disc shaped items.

FIG. 23 is a perspective view of an insertable conveying member which provides individual containers on the conveying surface.

FIGS. 24A and 24B are a perspective view and a side view respectively of an insertable conveying member which forms a continuous sheet surface on top of the conveyor belt.

BEST MODE FOR CARRYING OUT THE INVENTION

Figure 9:
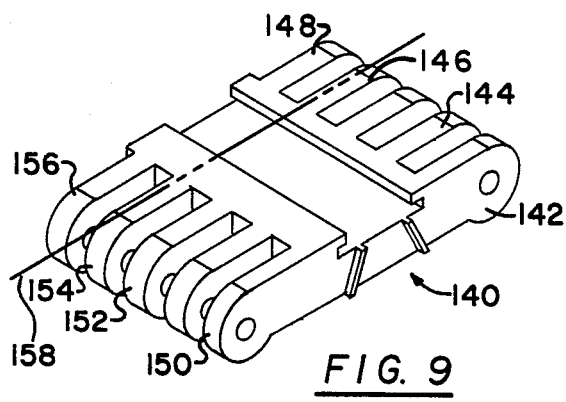
FIG. 9 shows a top view of the base member of FIG. 6 having the first plurality of pivot ends in line with the second plurality of pivot ends, and including recesses for receiving the projections of a toothed sprocket wheel.

Referring now to FIG. 1, there is shown generally at 20 an endless loop conveyor belt 22 having a first sprocket 24 and a second sprocket 26. As will be appreciated by those skilled in the art, either first sprocket 24 or second sprocket 26 may be used to provide a driving force to belt 22. Further, as can be seen belt 22 has a section with side walls 28, and a top surface of various shapes 30A through 30F for moving various items of different shapes in a direction as indicated by an arrow 32.

As shown in FIG. 2, which is a blown up portion of a section 34 of the conveyor belt of FIG. 1, section 34 of belt 22 is formed of a multiplicity of identical modules, such as modules 36, 38, 40, 42 and 44, each of which has a first plurality of pivot ends 36A, 38A. 40A, 42A and 44A, and a second plurality of pivot ends 36B, 38B, 40B, 42B, and 44B respectively. As can also be seen, modules 36 and 38 are arranged side-by-side such that the apertures defined in each of the plurality of pivot ends 36B and 38B are arranged coaxially. In a similar manner the modules 40 and 42 are also arranged side-by-side such that the pivot holes defined in the plurality of link ends 40A and 42A are also coaxial. The plurality of pivot ends 36B and 38B of their respective modules 36 and 38 are then intermeshed with the plurality of pivot ends 40A and 42A of modules 40 and 42 such that all of the pivot holes of the intermeshed pivot ends are coaxial and the modules are all pivotally connected by a single pivot rod 46. Thus it can be seen that the conveyor belt of FIG. 1 is therefore formed of a large plurality of such modules arranged side-by-side and end-to-end and joined by a multiplicity of pivot rods such as 46, 48 and 50 so that the conveyor belt may be formed as an endless loop around sprockets 24 and 26 as is shown in FIG. 1.

Referring now to FIG. 3, there is shown a perspective view of one of the modules, such as module 36 having a base member 37 and a conveyor member 39 which make up the section of belt 34 shown in FIG. 2. As will be appreciated by those skilled in the art, the base member 37 of such a module is preferably formed by injection molding of inherently slick or low friction material such as polypropylene, polyethylene, acetal and the like. The vertical flight or conveyor member 39 will normally also be molded of such materials, but could be molded from a softer and more resilient rubber or plastic. Such conveyor members could also be injection molded, but would normally be molded by an extrusion process because of the continuous and regular cross-section. As can be seen more clearly in the broken-out view of FIG. 3A, the base member 37 of each module is formed of a plurality of elongated elements each of which has a first pivot end 52A and a second pivot end 52B joined by an intermediate section 54. In a similar manner, the plurality of pivot ends 36A of the base member 37 is comprised of a plurality of parallel members such as shown at 52A, 56A, 58A and 60A, each of which member defines an aperture such as aperture 62 in pivot end 52A. And as can also be more clearly seen in this figure of a single base member, the pivot axis of the apertures such as aperture 62 defined in each of the parallel pivot ends of the pluralities of pivot ends 36A are all aligned coaxially along a pivot axis indicated by pivot line 64. In a similar manner, all of the pivot holes defined in the plurality of pivot ends 36B are aligned coaxially along a second pivot axis 66. Although the pivot apertures of FIG. 3 are shown as circular, such pivot apertures do not necessarily have to be circular in cross-sections but may be another suitable shape as required to permit cleaning, etc. However, a circular shape such as is shown in FIGS. 3 and 3A are the most easily manufactured. Pivot axes 64 and 66, as will be appreciated by those skilled in the art are parallel to each other and thereby define a common first plane.

As can also be clearly seen by FIGS. 3 and 3A, each of the plurality of link ends 36A and 36B respectively are joined by and formed integral with an intermediate section 54. Intermediate section 54, as can be seen, maintains each of the individual pivot ends of the plurality of pivot ends of 36A and 36B parallel to each other and at a selected spaced distance from each other. It will also be appreciated that since each of the pluralities of pivot ends must intermesh with the plurality of the pivot ends of another base member, the individual pivot ends such as pivot ends 52A, 56A, 58A and 60A have a thickness which is less than the spacing between adjacent pivot ends such as the space indicated by arrow 68 between pivot end 70B and pivot end 60B.

Further, although different types of pivot ends and intermediate sections may be used in forming modules incorporating the teaching of this invention (as will be discussed in detail hereinafter), in a preferred embodiment, such as shown in FIGS. 3 and 3A, the first plurality of pivot ends 36A are laterally offset from the second plurality of link ends 36B such that each of the pivot ends of the first plurality 36A are in register with the spaces between the link ends of the second plurality of 36B and visa-versa. Offsetting the plurality of pivot ends 36A laterally from the pivot ends 36B as illustrated in FIG. 3 and 3A, allows the modules to be arranged end to end and still provide a substantially continuous outside edge. Referring again to FIG. 3, and now to FIGS. 4A and 4B which are side views of the base member 37 and the conveying member 39 of FIG. 3, and FIGS. 5A and 5B which are top views of the base member 37 and conveying member 39 of FIG. 3, it can be seen that the conveying member 39 which is made out of a suitable material such as hard rubber, plastic, or the like, is formed with an attaching portion 72 suitable for locating within a recess 74 of the base member 37 and includes an upper portion 76 of substantially any desired shape which protrudes above the top plane 78 of the base member 37 thereby providing a conveying surface which exhibits substantially any shape necessary for conveying items requiring special handling. As shown, the conveying member 39 includes a bottom portion or an attaching portion 72 which conforms to the recess 74 in base member 37 and which is restrained within the recess 74 by means of an overhang such as ledges 80 and 82 clearly clearly shown in FIGS. 4A and 5A, which extend over the recess 74 thereby maintaining conveying member 39 in position. As can best be seen in FIG. 4B, conveying member 39 may also include a hollow or scalloped out area 84 which would allow attaching portion 72 of conveying member 39 to be deformed sufficiently to be inserted in the recess 74 and under the restraining ledges 80 and 82 if the conveying member is made of a resilient material. This of course allows for easy insertion of a resilient conveying member. Non-flexible or conveying members which are not resilient may of course be inserted from the side as is indicated in FIGS. 5A and 5B by heavy arrow 86. It will, of course, be appreciated that the conveying member 39 may be of a length substantially the same as that of the width of the base member 37 such that a conveying member may be inserted in each base member making up a belt such as shown by vertical flight members 88, 90 and 92 which extend across modules 40, 42 and 43 in FIG. 2. Alternately, and as is also shown in FIG. 2, a single conveying member 94 may have a length equal to a plurality of the widths of two or more modules, and extend across two or more such modules as shown by conveying member 94 extending beyond both ends of module 44 and across modules 45 and 47 when the modules are arranged in a side-by-side relation. To fabricate a belt wherein the conveying member extends across two or more modules, it will be appreciated of course that the side-by-side modules should first be pivotally connected and then the conveying member 94 inserted into the recess 74. It will further be appreciated that although the conveyor belt may be fabricated wholly out of modules, wherein each module includes a conveying member, it should be understood that as shown in FIG. 6, and as will be discussed in detail hereinafter a desired belt may be fabricated partially out of modules having conveying member according to the teachings of this invention, such as modules 96, 98 and 100, and partially of similar plain top modules, which do not include the insertable conveying members such as modules 102 and 104.

In the embodiment of FIG. 4A, there is also shown a tooth member 106 extending from the intermediate section 54 and substantially equal distance between to the two pivot axes 64 and 66. As can be seen in FIG. 7, the plurality of modules of a type shown in FIG. 4A are driven by a sprocket wheel 108 which has cooperating recesses 110, 112 and 114 which receive a tooth similar to tooth 106 of FIG. 4A, and similar teeth on other modules, such that the modules receive thereby a driving force which is orthogonal to the axes 64 and 66 and which at the same time is substantially parallel to the plane defined by axes 64 and 66. It will, of course, be appreciated that as shown in FIG. 1, and discussed in detail hereinafter, the cross-section of the conveying member may have any suitable shape for providing the desired conveying surface necessary to handle the items being conveyed.

It will be appreciated of course that as discussed in the background of this application there are now various types of modular belts being manufactured. Therefore, referring again to FIG. 6 there is shown a side view of another type module which incorporates the insertable conveying member of this invention, but which receives its driving force in a different manner. As shown, rather than using a driving tooth on each module each row of modules instead define a recess such as recesses 116, 118, 120 122 and 124 suitable for receiving a tooth protruding from the circumference of a drive sprocket wheel 126. For example, recess 120 is shown as receiving tooth 128.

Figure 10:
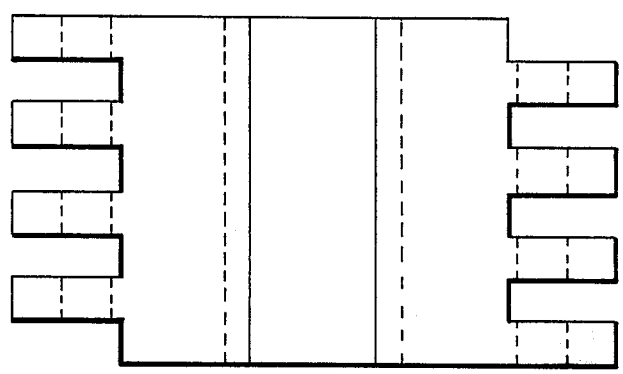
FIG. 10 shows a top view of a base member similar to the base member of FIG. 9, except the first plurality of ends are laterally offset from the second plurality of pivot ends
Figure 11:
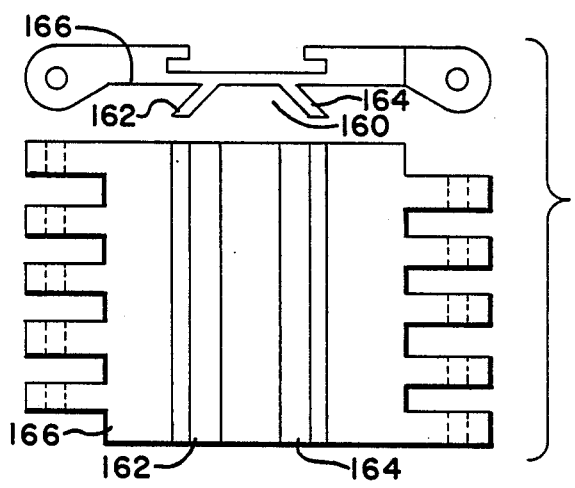
FIG. 11 shows one embodiment of a side view and bottom view of a base member having a top view similar to that of FIG. 10.
Figure 12:
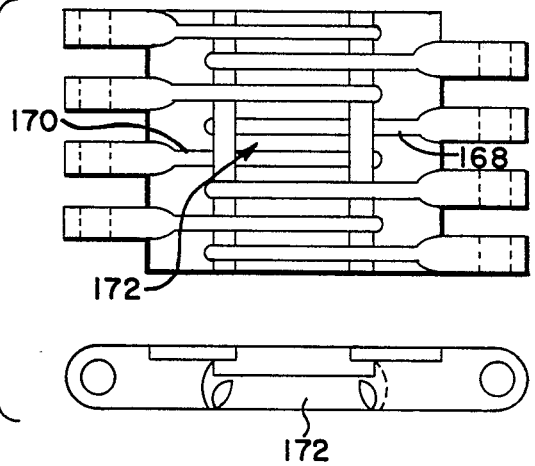
FIG. 12 shows both a side and bottom view of still another alternate embodiment having a top view similar to that of FIG. 10.
Figure 13:
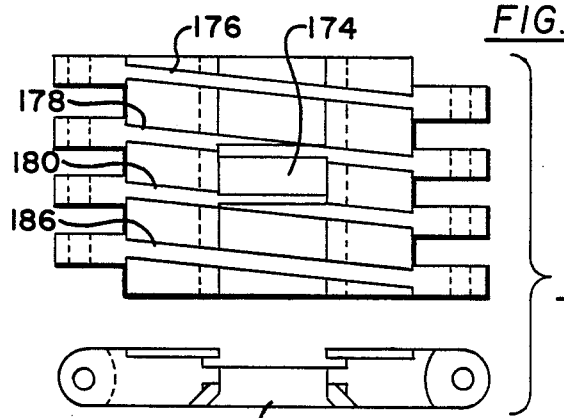
FIG. 13 shows still another top and bottom view of another alternate embodiment having a top similar to that of FIG. 10.

In a similar manner, FIG. 8 shows still another type base member of a link belt wherein contoured teeth 130 and 132 extending from the circumference of another drive sprocket 134 engage and contact surfaces 136 and 138 on the link or pivot end rather than at an intermediate recess. Thus, it will be appreciated that the teachings of this invention may be incorporated with link belts which may be different in appearance, and may use substantially any type of driving means. As a further example, FIG. 9 illustrates a single module 140 comprised of a first plurality of pivot ends 142, 144, 146 and 148 and which is the type shown in FIG. 6 without one of the various conveying members being inserted. In this module 140, it can be seen that the first plurality of pivot ends on one side of the base member are in line with pivot ends 150, 152, 154 and 156 on the other side as is illustrated by straight line 158 which extends through pivot ends 146 and 154. This in line arrangement would also apply to modules of a belt similar to that shown in FIG. 8. As a further example, FIG. 10 shows a top view of a base member wherein the pivot ends are laterally offset. Several types of base member construction may present a top view similar to that shown in FIG. 10. As can be seen from the bottom and side view of FIG. 11, a sprocket tooth of a sprocket wheel engages a pocket 160 formed by angled members 162 and 164 protruding from the underside portion 166 of the base member rather than a recess actually formed in the base member. Likewise, as shown in the side and bottom views of FIG. 12, the plurality of alternating elongated members such as members 160 and 170 may include partially void areas such as 172 which form the recess for receiving the tooth of a drive sprocket. In a similar manner, the side and bottom views of FIG. 13 show how a recess 174 may be formed even though the elongated members include angled members 176, 179, 180 and 182 to achieve the lateral offset of the two pluralities of pivot ends.

Figure 14:
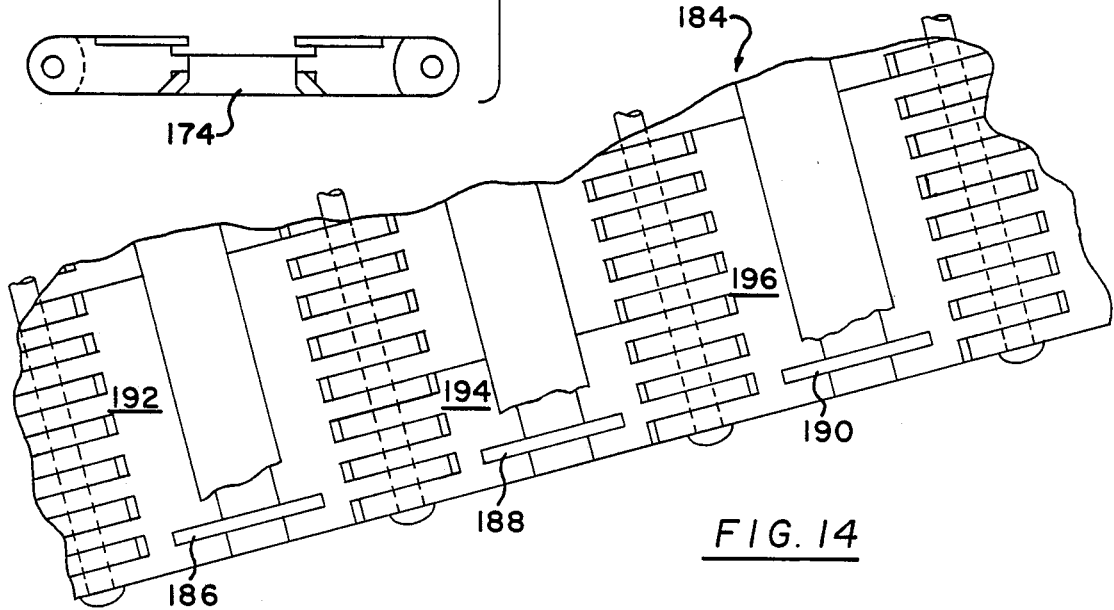
FIG. 14 shows a conveyor belt section having a conductive material imbedded in the outside modules of a belt which serve as the armature of a linear motor having electrical coils which serve as a stator for interacting with and moving said armature.
Figure 15:
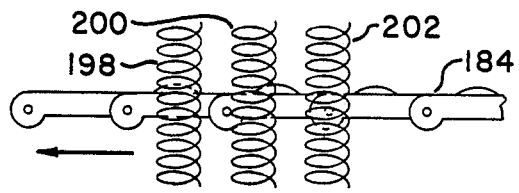
FIGS. 15 and 16 show a side and end view respectively of the belt of FIG. 14 with the stator coils in place.
Figure 16:
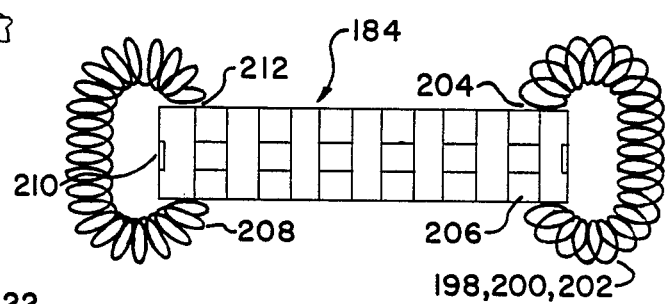

It is also clear, as shown in the perspective side and end views of belt 184 of FIGS. 14, 15 and 16 respectively, that it is not necessary that a drive sprocket be used at all. According to the FIGS. 14, 15 and 16, an electric conductive material 186, 188 and 190 is secured to selected modules such as modules 192, 194 and 196 located at the outside edge of belt 184 which is comprised of a plurality of otherwise similar modules. Although the conductive material may be secured by any means to the selected modules, it will be appreciated that in a preferred operation the conductive material may preferably be imbedded in the end portions of the selected modules which will ultimately form the edges of the assembled belt during the injection molding process. A plurality of these modules having the conductive material imbedded therein are then arranged end-to-end on both edges of the belt such that they are in alignment with each other. Further as is shown in FIGS. 15 and 16, one or more C-shaped coils 198, 200 and 202 are arranged such that the opening 204 of the C-shaped coil passes over the aligned magnetic members on side 206 of belt 184. In a similar manner, another series of C-shaped coils (such as coil 208) are arranged so that the conductive materials on side 210 pass between the C-shaped openings 212 of their respective coils. Thus in this manner, the conductive members in the belt act as the armature of a linear motor and electrically interact with the coils which are sequentially electrically activated to move the belt in a direction orthogonal to the pivot axis and substantially parallel to the plane defined by the pivot axis. Thus, as discussed above it can be seen that modular conveying belts using any type of driving force for imparting motion to the conveyor belt may incorporate the teachings of this invention.

Figure 17:
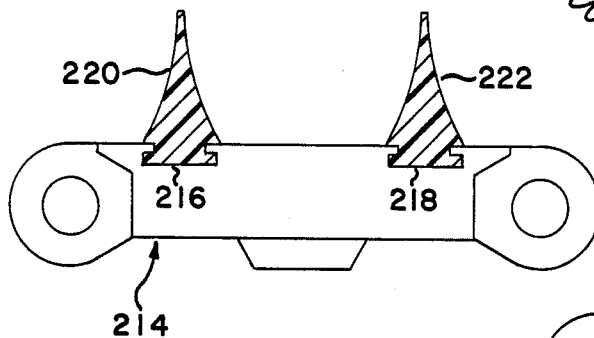
FIG. 17 illustrates a conveying module similar to FIG. 2, except two conveying flight members are attached to each base member.

As discussed heretofore, a single conveying member having a desired conveying surface has been combined with a base member to form a conveyor belt having a conveying surface of any desired shape. However, as shown in FIG. 17, a typical base member 214 similar to that discussed with respect to FIG. 4A may instead define a pair of recesses 216 and 218 each of which receives a conveying member 220 and 222 respectively which may be similar for example to the vertical flight members discussed above. It will also be appreciated of course that even additional recesses could be included and three or more vertical flight or conveying members inserted in such recesses.

Figure 18A:
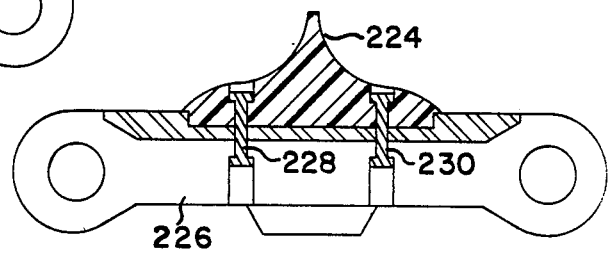
FIGS. 18A, 18B, 18C and 18D show still other alternate methods of attaching the conveying members of various shapes to the top portion of the base member.
Figure 18B:
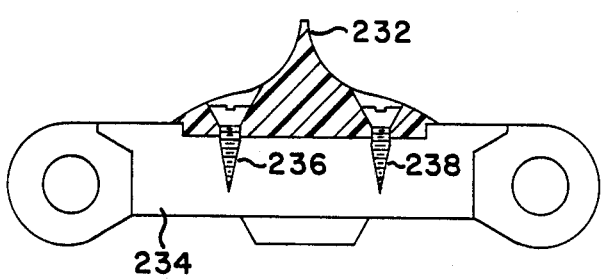
Figure 18C:
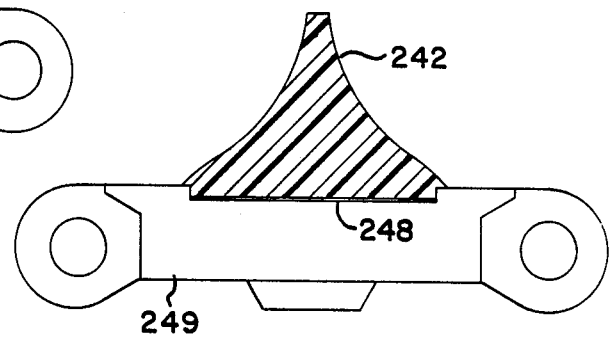

Further, although to this point the conveying members have been described as being secured to each individual base member by being inserted in recesses and retained by overhangs such as ledges or tabs, it will be appreciated of course that other methods of attaching the conveying member may be used. For example, FIG. 18A shows how conveying member 224 may be attached to module 226 by means of brads or rivets 228 and 230. In a similar manner, and as shown in FIG. 18B conveying member 232 may be attached to base member 234 by screw member 236 and 230. Other techniques may simply include the use of an adhesive 240 located between the conveying member 242 and the base member 244 as illustrated in FIG. 18C.

Figure 18D:
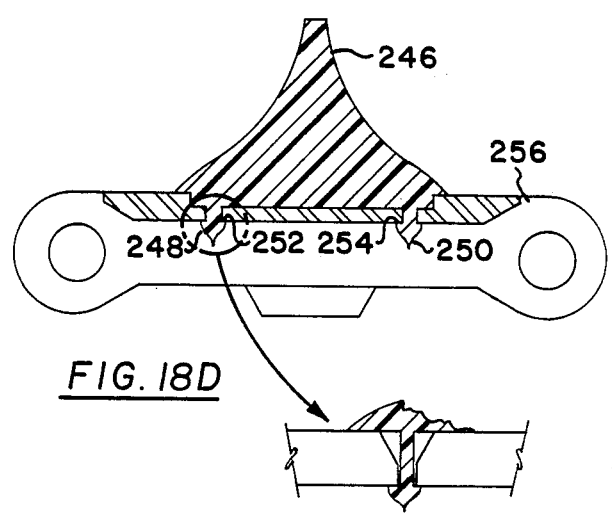

A still further method of attaching as shown in FIG. 18D, would be to simply mold integrally with the conveying member 246 fastening pins 248 and 250, with shoulders 252 and 254 which could be inserted through properly aligned conical shaped holes in the base member 256. These pins and shoulders would obviate the need for any undercuts in the plastic base member and for separate fastening devices such as screws, rivets and adhesives.

Figure 19A:
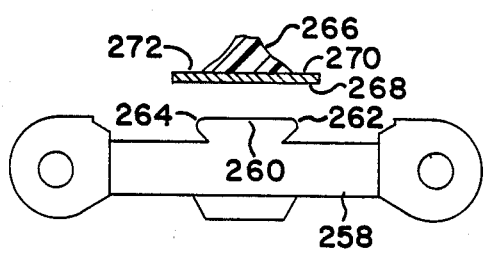
FIGS. 19A and 19B show yet another method of attaching the conveying member to the base member.
Figure 19B:
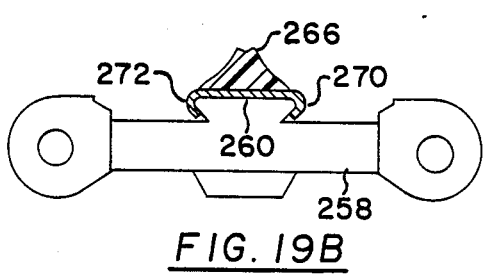

As an alternate method to the previously described methods o attaching (wherein a recess was typically used) FIGS. 19A and 19B show yet another method of attaching the conveying member to the base member. As shown in these figures, the conveying module 258 defines a top surface 260 which includes protrusions 262 and 264. The conveying member 266 is permanently and securely bonded to a deformable member 268, such as for example a strip of soft iron. The combination soft iron member 268 and conveying member 266 is then attached to the top surface 260 by crimping the edges 270 and 272 of the soft metal strip 268 around protrusions 262 and 264. Thus, it will be appreciated that the teachings of this invention are intended to include all methods of attaching one or more conveying members to a module, and it should be appreciated that the techniques discussed herein are examples only.

To this point, it is clear that a conveying member such as a vertical flight conveying member may be combined with a base member to form a conveyor belt having a multiplicity of vertical flights extending across the width of the belt. FIG. 2 and section 34 of FIG. 1 discussed heretofore give specific examples of such a belt. However, FIG. 1 also clearly shows that many other various shaped conveying members may be combined with the base member to provide substantially any type of conveying surface necessary for handling and conveying items of any shape and which require special handling. For example, and as was discussed heretofore, vertical flight members such as shown in FIGS. 2, 3 and 4 as well as other figures may be inserted in a base member 37 such as shown in FIG. 3 to produce a typical belt. FIG. 4B illustrates a side view of such a conveying member, and FIG. 20A is a typical front view. However, as shown in FIG. 20A, the typical vertical flight member 274 may also include opening such as apertures 276, 278 and 280 if desired. Of course even though the apertures shown in FIG. 20A are circular, it would not be necessary that the apertures define any particular shape. FIGS. 20B and 20C show views of still other possible conveying member forms. For example, as is shown in FIG. 20B a conveying member having a side view similar to that of FIG. 4B may instead of a solid vertical flight member comprise a series of vertical members such as vertical pins 282, 284, 286 and 288 to form a comb-type conveying member. Alternately, as shown in FIG. 20B, the vertical pins may be sharpened to form nails or spikes 290, 292 and 294 suitable for piercing and securing large and penetrable items such as large portions of meat, bales of cotton, hay, etc. to the belt for conveying over a selected course including a course which includes up and down inclines.

Referring now to FIG. 21, there is shown still another conveying member which is similar to the conveying member shown in FIG. 20A except that the vertical portion 296 is rotated 90° with respect attaching portion 298 such that when this type member is inserted in a base member such as base member 37 of FIG. 3, there may be formed sidewalls such as shown at 28 in FIG. 1 or intermediate vertical walls which are parallel to the direction of travel of conveying belt such as shown at 30D in FIG. 1. It will also be appreciated of course, that a pair of such vertical walls perpendicular to the direction of travel of the conveying belt may be formed so as to produce a parallel channel such as channel 300 located between the two sets of vertical walls 28 and 30D in FIG. 1. The vertical members such as shown on FIG. 21 may have a rectangular appearance as shown, or alternately could include a trailing edge portion 302 as shown in FIG. 21, or trailing edges 304, 306 and 308 shown in FIG. 1. Such trailing edges maintain the formed channels even when the belt is reversing directions as it travels over a drive sprocket.

Referring now to section 30E of FIG. 1 and FIGS. 22A and 22B, there is shown still another technique for forming longitudinal channels which are parallel to the direction of belt travel. The longitudinal channels formed by these insertable conveying members shown in 22A and 22B have been found to be particularly suitable for conveying tubular shaped items or a multiplicity of stacked disc shaped items such as cookies.

To this point, there have been discussed various types of conveying members which cooperate with a base member for forming a particular type of conveying surface on a conveying belt. Referring now to FIG. 23 and section 30F of FIG. 1, it can be seen that substantially any shape may be formed and used with this technique. For example, as shown in FIG. 23 a opened box-like container 310 is secured to the base attaching member 312 which is inserted in the base member 37. Thus, according to this technique, an open box container for conveying small items may be provided. As shown at 30F in FIG. 1, such opened faced containers may be of substantialy any size and/or shape for carrying small items or even liquid items.

Finally, it will be appreciated that in many instances it is desirable for meeting USDA requirements or to prevent the loss of very small particle items, that a conveyor belt having no holes, seams or apertures where bits and pieces of the conveyed material may collect be available. To this end, as shown in FIG. 24A and 24B a normal or typical flat conveyor belt may be provided with a multiplicity of attaching base members 314, 316 and 318 attached to a sheet member 320. Such a sheet member 320 may be of any desired or necessary length to completely cover the entire belt so as to present a surface with no seams or apertures. Thus, it will be appreciated that there will be no crevices or pivot points where materials and/or germs may collect. Thus, according to this technique a completely seamless and crevice-free belt may be provided.

Thus, although there has been described to this point particular embodiments of modules for forming conveyor belts having a variety of conveying surface, it is not intended that such specific references be considered as limitations upon the scope of this invention except insofar as set forth in the following claims.

I claim:

1. A pivotally joined conveyor belt comprising a plurality of modules of identical pitch dimensions adapted to be pivotally connected end-to-end and side-by-side by a plurality of pivot rods, said modules integrally molded from a plastic material, selected ones of said modules comprising:

a base member pivotally joined with other modules, and having a selected pitch dimension between first and second pivotal ends, said first pivotal ends joined and maintained parallel to said second pivotal ends by an intermediate section, said intermediate section defining a recess and overhang extending over said recess on the top thereof; and conveying members of a selected shape and having a dimension extending between said first and second pivotal ends which is fully within said intermediate section, said conveying members further having an attaching bottom portion for being removably positioned in said recess and retained in a fixed location by said overhang, said conveying members having a shape for providing a conveying surface of a selected configuration on said top side of said base member.

2. A module having a conveying surface of a selected shape for forming a modular conveyor belt, said belt comprised at least in part of a plurality of modules having such a selectively shaped conveyor surface, each of said modules of said conveyor belt having identical pitch dimensions and pivot ends adapted to be connected end-to-end and side-by-side, and said modules being integrally molded from a plastic material, and each module of said plurality having a selectively shaped conveying surface comprising:

a base member having a first and second plurality of integrally molded pivot ends joined by and formed integral with an intermediate section, and having a top portion and a bottom portion to form a top and bottom side of said intermediate section, said top side defining a recess and a overhang extending over said recess and said first and second pluralities of pivot ends connected parallel to and at a spaced distance from each other such that said conveyor belt may be connected end-to-end and side-by-side;

said base member further including means for receiving a driving force, at least a component vector of which is, orthogonal to a pair of pivot axis through said first and second pluralities of pivot ends, and also substantially parallel to a first plane common to said pair of pivot axis to move said module in a direction perpendicular to said pivot axis;

a conveying member having a bottom attaching portion for being positioned in said recess and retained in a fixed location by said overhang of said base member, said conveying member having a selected shape so as to provide a conveying surface of a selected shape and having a dimension extending between said first and second pivot ends which is fully within said intermediate section; and said conveying member being adapted for selective insertion and removal from said recess of said base member such that said selected shape of said conveying surface is suitable for handling various shaped items.

3. A module having a selectable conveying surface for forming a modular conveyor belt, said conveyor belt comprised at least in part of a plurality of modules having said selectively shaped conveying surface, each of said modules of said conveyor belt having identical pitch dimensions and pivot ends adapted to be connected end-to-end and side-by-side, and said modules being integrally molded from a plastic material, and comprising;

a base member including a first and second plurality of pivot ends joined by and formed integral with an intermediate section, each of said first and second plurality of pivot ends defining a pivot axis, and each of said pivot ends of a plurality connected parallel to and at a spaced distance from each other by said intermediate section, and said intermediate sections having a top portion and a bottom portion for forming a top side and a bottom side of said base member, the pitch of the module being equal to the length of the intermediate section plus a first and second pivot end, and the width of the module being determined by the number of connected pivot ends;

said pivot axis defined by each of said first pivot ends of said base member being aligned coaxially and comprising a first plurality of coaxially aligned pivot ends and said pivot ends defined by each of said second pivot ends being aligned coaxially and comprising a second plurality of pivot ends and such that said pivot axis of said first and second pluralities define a common first plane, the thickness of said first and second pivot ends being less than the spacing between adjacent pivot ends such that said first and second pluralities of pivot ends are suitable for intermeshing with similar first and second pluralities of pivot ends of another module so that the pivot axis of the pivot ends of such intermeshed modules are also coaxial and suitable for being connected end-to-end and side-by-side;

said base member further including means for receiving a driving force at least a component vector of which is, orthogonal to said pivot axis and substantially parallel to said common first plane to move said module in a direction perpendicular to said pivot axis, said top side of said base member defining a recess and a overhang extending over said recess for attaching a conveying member;

a conveying member having a bottom attaching portion for being positioned in said recess and retained in a fixed location by said overhang on said top side of said base member, said conveying member further defining an upper portion of a selected shape such that when attached to said top side of said base member a conveyor belt may be formed having a conveying surface of a selected shape and having a dimension extending between said first and second pivot ends which is fully within said intermediate section; and said conveying member being adapted for selective insertion and removal from said recess to join said conveying member and said base member to provide a conveying belt comprised at least in part of such modules for conveying items of selected shapes by said conveying belt.

4. The module of claim 3 wherein said first plurality of pivot ends of a module are laterally offset from said second plurality of pivot ends such that each pivot end of said first plurality are in register with the spaces between the pivot ends of said second plurality and said pivot ends of said second plurality are in register with the spaces between the pivot ends of said first plurality.

5. The conveying belt of claim 1 wherein said base member further comprises a bottom side having means for receiving a driving force to move said belt along a selected direction of travel.

6. The modules of claims 2, 3 or 5 wherein said means for receiving a driving force, is a tooth extending from said bottom side of said base member for engaging a cooperating recess in a drive sprocket.

7. The modules of claims 2, 3, or 5 wherein said means for applying a driving force is a recess defined in said bottom side of said base member for receiving a cooperating tooth extending from a drive sprocket.

8. The modules of claims 2, 3 or 5 wherein said means for receiving a driving force is a contact area on selected ones of said pivot ends for engaging a cooperating tooth shaped to conform with said pivot ends and extending from a drive sprocket.

9. The modules of claims 2 or 3 wherein, each module of said conveyor belt positioned with respect to another module such that one of said first and second pluralities of pivot ends of a module is intermeshed with one of said first and second pluralities of pivot ends of another one of said modules;

and further comprising a plurality of pivot rods for pivotally joining said modules to form said conveyor belt.

10. The module of claim 9 wherein the modules of said conveyor belt are further arranged in a side-by-side relationship with other modules such that the pivot axis defined by said first plurality of pivot ends and said second plurality of pivot ends respectively are coaxial with respect to adjacent side by side modules.

11. The module of claim 9 wherein said first and second pluralities of pivot ends are further pivotally joined to form an endless loop.

12. The module of claim 9 wherein said means for receiving a driving force further includes a conductive material secured to selected elongated elements located at the outside edge of selected ones of said plurality of modules, and a plurality of electrical coils positioned to electrically interact with said conductive material of said selected elongated elements such that said selected elongated elements and said electrical coils operate as an armature and drive coils respectively of a linear motor so that sequentially energizing said electrical coils generates a moving field which interacts with said conductive material to provide said driving force.

13. The module of claim 5 wherein said conveying members have a shape for forming vertical flight members.

14. The module of claim 5 wherein said conveying members have a shape for forming vertical surfaces extending parallel to the direction of travel of said belt.

15. The module of claim 5 wherein each of said conveying member have a shape for forming a multiplicity of pin members extending above the top side of said belt.

16. The module of claim 5 wherein said conveying members define a multiplicity of individual containers on the top side of said conveyor belt.

17. The module of claim 5 wherein a plurality of parallel conveying members are secured to a flexible sheet member such that the top side of said conveying belt is covered by said flexible sheet member to provide a substantially seamless cover on the top side of said conveyor belt.

18. The module of claims 2 or 3 wherein said conveying members have a shape for forming vertical flight members.

19. The module of claims 2 or 3 wherein said conveying members have a shape for forming vertical surfaces extending parallel to the direction of travel of said belt.

20. The module of claims 2 or 3 wherein each of said conveying member have a shape for forming a multiplicity of pin members extending above the top side of said belt.

21. The module of claims 2 or 3 wherein said conveying members define a multiplicity of individual containers on the top side of said conveyor belt.

22. The module of claims 2 or 3 wherein a plurality of parallel conveying members are secured to a flexible sheet member such that the top side of said conveying belt is covered by said flexible sheet member to provide a substantially seamless cover on the top side of said conveyor belt.

23. The module of claim 5 wherein said means for receiving a driving force is integrally formed with said module.

24. The module of claim 5 wherein said means for receiving a driving force comprises a plurality of means on a single module.

25. The modules of claim 2 or 3 wherein said means for receiving a driving force comprises a plurality of means on a single module.

* * * * *